(12) United States Patent
Krolo

(10) Patent No.: US 11,285,769 B2
(45) Date of Patent: Mar. 29, 2022

(54) CHASSIS SUSPENSION COMPONENT WITH ECCENTRIC DISC STOP AND METHOD FOR PRODUCING A CHASSIS SUSPENSION COMPONENT

(71) Applicant: Autotech Engineering Deutschland GmbH, Bielefeld (DE)

(72) Inventor: Mario Krolo, Steinhagen (DE)

(73) Assignee: Autotech Engineering Deutschland GmbH, Bielefeld (DE)

( * ) Notice: Subject to any disclaimer, the term of this patent is extended or adjusted under 35 U.S.C. 154(b) by 363 days.

(21) Appl. No.: 16/284,209

(22) Filed: Feb. 25, 2019

(65) Prior Publication Data

US 2019/0263207 A1    Aug. 29, 2019

(30) Foreign Application Priority Data

Feb. 27, 2018   (EP) .................................. 18158916

(51) Int. Cl.
*B60G 7/00*    (2006.01)
*B60G 7/02*    (2006.01)
(Continued)

(52) U.S. Cl.
CPC ............. *B60G 7/001* (2013.01); *B21D 28/32* (2013.01); *B21D 53/88* (2013.01); *B60G 7/02* (2013.01); *B62D 17/00* (2013.01); *B60G 2200/4622* (2013.01); *B60G 2204/44* (2013.01); *B60G 2206/10* (2013.01); *B60G 2206/70* (2013.01); *B60G 2206/722* (2013.01); *B60G 2206/811* (2013.01); *B60G 2206/8103* (2013.01)

(58) Field of Classification Search
CPC ...... B60G 7/02; B60G 7/001; B60G 2206/10; B60G 2204/44; B60G 2200/4622
See application file for complete search history.

(56) References Cited

U.S. PATENT DOCUMENTS

| 4,753,454 A | 6/1988 | Woehler |
| 5,201,898 A * | 4/1993 | Pierce .................... B60G 11/27 280/86.75 |

(Continued)

FOREIGN PATENT DOCUMENTS

| DE | 3630180 A1 | 3/1988 | |
| DE | 4437661 A1 * | 4/1996 | ............... B60G 7/02 |

(Continued)

*Primary Examiner* — Nicole T Verley
(74) *Attorney, Agent, or Firm* — The Webb Law Firm

(57) ABSTRACT

The invention relates to a chassis suspension component with a bracket made from a formable base material, preferably sheet steel, and comprising at least one slot for receiving a connecting bolt and at least one stop for an eccentric disc which is or can be connected rotationally fixedly to the connecting bolt. In order to be able to produce the eccentric stop process-reliably and economically without the risk of crack formation, the invention proposes to provide a tab formed from the base material and folded relative to a body portion of the suspension component and having a recess surrounding the slot, which recess defines two elongate stop faces running parallel to each other, wherein the stop faces serve as a stop for the eccentric disc. The invention also relates to a method for producing a chassis suspension component.

10 Claims, 5 Drawing Sheets

(51) Int. Cl.
  *B21D 28/32*   (2006.01)
  *B21D 53/88*   (2006.01)
  *B62D 17/00*   (2006.01)

(56) References Cited

U.S. PATENT DOCUMENTS

| | | | |
|---|---|---|---|
| 5,398,411 A | 3/1995 | Kusaka et al. | |
| 9,233,589 B1* | 1/2016 | Miller | B60G 7/02 |
| 9,452,640 B2* | 9/2016 | Mater, Jr. | B60B 35/007 |
| 10,017,020 B2* | 7/2018 | Andreasen | F16B 2/005 |
| 10,864,790 B2* | 12/2020 | Behn | B60G 7/02 |
| 2002/0063408 A1* | 5/2002 | Klais | B60G 11/181 |
| | | | 280/124.134 |
| 2005/0156398 A1* | 7/2005 | Ramsey | B60G 9/003 |
| | | | 280/124.116 |
| 2007/0013171 A1* | 1/2007 | Tuthill | B60G 11/24 |
| | | | 280/684 |
| 2007/0126263 A1* | 6/2007 | Ramsey | B62D 21/02 |
| | | | 296/203.01 |
| 2015/0231940 A1 | 8/2015 | Klaassen et al. | |
| 2016/0059653 A1* | 3/2016 | Gan | F16B 35/041 |
| | | | 280/86.753 |
| 2016/0121676 A1* | 5/2016 | Drabon | B60G 7/02 |
| | | | 280/124.125 |
| 2020/0138518 A1* | 5/2020 | Lang | A61B 90/37 |
| 2020/0190814 A1* | 6/2020 | Hatzinikolas | E04F 13/09 |
| 2020/0282784 A1* | 9/2020 | Zimmerman | F16F 1/3842 |
| 2021/0244995 A1* | 8/2021 | Andrei | A63B 21/153 |

FOREIGN PATENT DOCUMENTS

| | | | | |
|---|---|---|---|---|
| DE | 10239388 A1 | 3/2004 | | |
| DE | 102006046179 A1 * | 4/2007 | | B60G 7/02 |
| EP | 0257190 A2 | 3/1988 | | |
| EP | 0306626 A2 * | 3/1989 | | B62D 17/00 |
| EP | 0306626 A2 | 3/1989 | | |
| EP | 0943529 A1 | 9/1999 | | |
| EP | 1110847 A1 * | 6/2001 | | B62D 17/00 |
| EP | 2910454 B1 | 8/2016 | | |
| GB | 2257670 A * | 1/1993 | | B62D 27/065 |
| JP | 2005280651 A * | 10/2005 | | B60G 7/02 |
| WO | WO-2018033270 A1 * | 2/2018 | | B60G 7/02 |

* cited by examiner

CHASSIS SUSPENSION COMPONENT WITH ECCENTRIC DISC STOP AND METHOD FOR PRODUCING A CHASSIS SUSPENSION COMPONENT

CROSS-REFERENCE TO RELATED APPLICATION

This application claims priority to European Patent Application No. 18158916.9 filed Feb. 27, 2018, the disclosure of which is hereby incorporated by reference in its entirety.

BACKGROUND OF THE INVENTION

The invention relates to a chassis suspension component with a bracket made from a formable base material, preferably sheet steel, and including at least one slot for receiving a connecting bolt and at least one stop for an eccentric disc, which is or can be connected rotationally fixedly to the connecting bolt. The invention furthermore relates to a method for producing the chassis suspension component.

Such suspension components, such as e.g. rear axle carriers, are provided with means for adjusting the tracking and camber of vehicle wheels at brackets for connection of control arms, in particular e.g. spring control arms and track rods. These means usually include an eccentric disc, which is connected rotationally fixedly to the connecting bolt serving for connection of the control arm, wherein a stop is assigned to the eccentric disc, wherein said disc rolls or slides against said stop on adjustment of the connecting bolt in order to adjust the tracking and camber.

In the prior art, the stop for the eccentric disc is created for example by at least one additional weld-on element, for example a U-shaped metal part, or by slotted perforations. These known solutions are not, however, satisfactory. In the case of slotted perforations, there is a risk of undesirable crack formation or crack propagation in the base material of the suspension component. Furthermore, the effort involved in observing the maximum permitted tolerances in relation to the shape and dimensions of the slotted perforations is relatively high. Also, when installing the connecting bolt, namely when tightening the bolt connection, the slotted perforations may be compressed so that the stop function is lost.

Production of the stop for the eccentric by welding on an additional element is associated with additional material costs and substantial process costs due to the additional production step required for welding. Furthermore, there is also the danger that the additional element will become detached if the weld connection is defective and/or exposed to corrosion.

EP 2 910 454 B2 discloses a chassis suspension component made from sheet steel with an eccentric stop. A depression is formed in the base material (sheet steel) of the chassis suspension component, which defines a peripheral edge region and a floor encased by the edge region, wherein the floor includes the slot and the edge region has two elongate faces running parallel to each other which serve as a stop for the eccentric disc. The eccentric stop in this known suspension control arm can be produced process-reliably and economically without the risk of crack formation.

On this basis, the object of the present invention is to create a further suspension component of the type cited initially, in which the eccentric stop can be produced process-reliably and economically without the risk of crack formation.

SUMMARY OF THE INVENTION

This object is achieved by a chassis suspension component with the features of the present disclosure. Preferred and advantageous embodiments of the chassis suspension component according to the invention are given herein.

The chassis suspension component according to the invention, which includes a bracket made from a formable base material, preferably sheet steel, having at least one slot for receiving a connecting bolt and at least one stop for an eccentric disc which is or can be connected rotationally fixedly to the connecting bolt, is characterised by a tab formed from the base material and folded relative to a body portion of the chassis suspension component and having a recess surrounding the slot, which recess defines two elongate stop faces running parallel to each other, wherein the stop faces serve as a stop for the eccentric disc.

The tab can be provided in the base material of the suspension component at relatively little cost, so that the stop faces of the eccentric stop can be provided favorably in terms of production technology. In comparison with the conventional solution in which an additional element is welded on as a stop, with the solution according to the invention the otherwise usual welding process is omitted. This allows a saving in production costs.

In comparison with the known solutions in which the stop for the eccentric disc is produced by slotted perforations, with the solution according to the invention the chassis suspension component is not weakened at the connection point. With the solution according to the invention, the problem of crack formation at the slotted perforations is avoided.

In particular, it is possible to produce the tab in a punching press and fold this in a forming tool, which tools are in any case required for producing the chassis suspension component from formable base material, preferably sheet steel.

The stop faces running parallel to each other are preferably oriented transversely or substantially orthogonally to the longitudinal axis of the at least one slot.

Because of the elongate stop faces running parallel to each other, the eccentric disc may preferably have a circular cylindrical peripheral edge. Such an eccentric disc can be produced relatively easily and is therefore available economically.

A preferred embodiment of the invention is characterised in that the recess of the tab is configured so as to be elongate. In this way, the two elongate stop faces running parallel to each other can be provided in a favourable fashion.

Furthermore, it is preferred if the recess has round or rounded corners. This embodiment leads to a favourable stress distribution in edge regions of the tab, so that the force exerted by the eccentric disc on the stop faces can be reliably absorbed by the tab or the chassis suspension component. The stop faces are connected together by portions, preferably running parallel to each other, of a yoke-shaped web of the tab. The transitions between the two mutually parallel portions and a middle part of the yoke-shaped web are preferably configured as arcuate web portions. Alternatively however, it is also possible that the two stop faces are connected together by arcuate portions of a yoke-shaped web of the tab. These two alternative embodiments both allow provision of a stop for the eccentric disc which is favourable in terms of construction and production.

A further preferred embodiment of the invention is characterised in that the tab is folded such that its fold line runs transversely, preferably substantially orthogonally to the longitudinal axis of the at least one slot. This embodiment also contributes to a favourable stress distribution in the tab on absorption of the force exerted by the eccentric disc on the stop faces. In particular, this embodiment leads to a particularly stable support of the eccentric disc on adjustment of the tracking and/or camber of the vehicle wheel concerned.

According to a further advantageous embodiment of the invention, the base material, with the exception of the folded tab, is formed as a substantially channel-like body with two legs, wherein at least one of the legs includes the slot. Preferably, both legs include a slot for receiving the connecting bolt, wherein the slots align with each other. By forming the chassis suspension component as a channel-like body with two legs, the functionalities of a chassis suspension component of the type concerned here, for example a spring control arm, in particular a spring control arm with a damper connection, can be provided in a structurally favourable fashion with a relatively low component weight.

Preferably, the tab is folded at the end face of the leg including the slot. In this way, the material consumption resulting from the tab can be kept low. Here, the tab is preferably formed on the end face of the leg which has a relatively small or the smallest distance from the slot formed in the leg. In this way, the material consumption resulting from the tab can be minimised. In particular, in this case it is not necessary for the tab to have a great physical extension in order to form a recess in the tab which surrounds the slot.

Particularly preferably, both legs of the channel-like body of the chassis suspension component have mutually aligned slots for receiving the connecting bolt, and folded tabs, wherein the respective tab according to one of the above-mentioned embodiments comprises a recess surrounding the assigned slot and defining two elongate stop faces running parallel to each other, wherein the stop faces serve as stops for the or an eccentric disc.

A further advantageous embodiment of the invention is characterised in that the folded tab and the leg including the tab delimit a gap, the gap width of which lies in the range from 0.1 to 10 mm, preferably in the range from 0.5 to 5 mm, particularly preferably in the range from 0.5 to 1 mm. The gap allows a full, superficial, reliably effective corrosion-protection coating of the tab and leg in the region of the slot. The corrosion protection may be applied for example by dip-coating or spray-coating of the chassis suspension component. A minimal gap width between the folded tab and the leg including the tab is preferred with the aim of minimizing the axial extension of the connecting bolt. Thus conventional connecting bolts may be used which are available relatively cheaply.

To ensure a high strength of the tab with low material usage, it is furthermore advantageous if, according to a further preferred embodiment of the invention, the recess in the tab delimits a yoke-like web of the tab, wherein the web has a width which amounts to at least twice, preferably at least three times the thickness of the tab. The middle elongate portion of the yoke-like web here defines one of the stop faces for the eccentric disc. Preferably, a smallest width of the web amounts to less than 15 times, preferably less than 10 times the thickness of the tab. It has been found that a tab width of this order of magnitude is sufficient to absorb the forces exerted on the web by the eccentric disc without deformation of the web or tab and without crack formation.

According to a further advantageous embodiment of the invention, the channel-like chassis suspension component including the tab is produced as one piece (single shell) from a single cut piece of sheet metal. Thus the leg including the tab and the tab have substantially the same thickness. The metal thickness here preferably lies in a range from 1 to 4 mm, particularly preferably in a range from 1.5 to 3 mm.

With respect to the folding properties of the tab or the stress distribution in the completed chassis suspension component, it is advantageous if, according to a further embodiment of the invention, the height of the tab is smaller than the height of the leg including the tab. The height of the leg is the distance of the longitudinal edge of the leg from the back face (base surface) of the channel-like chassis suspension component. The height of the tab may for example be 5 to 30% smaller than the height of the leg.

The object outlined above for the present invention is also achieved by a method for producing the chassis suspension component with the features given in the present disclosure.

The method according to the invention includes the following features:

a metal sheet, preferably sheet steel, is cut into a blank including a tab, before, during or after the cutting of the blank, a recess is cut in the metal sheet to receive an eccentric disc which is or can be connected rotationally fixedly to a connecting bolt, and adjacent to the recess a slot is cut out to receive the connecting bolt, the recess is arranged in the tab or in the region of the tab to be cut out, and is delimited by two elongate stop faces running parallel to each other, the blank is formed into a channel-like component having two legs, so that the tab is arranged on the end face of one of the legs of the component, and after cutting out the recess and forming the channel-like component, the tab is folded such that its recess surrounds the slot and the eccentric disc can be arranged in the recess, wherein the stop faces serve as a stop for the eccentric disc which is connected rotationally fixedly to the connecting bolt.

The advantages of such a method correspond to the advantages cited above in connection with the chassis suspension component according to the invention.

A preferred embodiment of the method according to the invention is characterised in that the tab is folded at a fold angle in the range from 175° to 185°, preferably with a fold angle of substantially 180°, relative to the leg on which the tab is arranged. In this way, advantageously, a gap can be achieved between the tab and the leg including the tab, the gap width of which lies for example in the range from 0.1 to 10 mm. In particular, after folding with such a fold angle, the tab runs substantially parallel to the longitudinal axis of the slot receiving the connecting bolt.

According to a further advantageous embodiment of the method, the slot is cut out of the metal sheet before the tab is folded. Thus the slot may for example be cut out at the same time as other recesses provided in the chassis suspension component, in one punching step. Preferably, the slot assigned to the connecting bolt and the recess assigned to the eccentric disc are cut simultaneously from the metal sheet, so that no additional production step must be performed to produce the recess and hence the production time is reduced.

According to a further embodiment of the method, the slot and/or the recess are cut out of the metal sheet before the channel-like component is formed. This is advantageous in particular with regard to production technology since production of the slot or recess after forming of the channel-like component is relatively difficult.

The invention is explained in more detail below with reference to a drawing showing exemplary embodiments. The drawings show:

DESCRIPTION OF THE INVENTION

Figure 1:
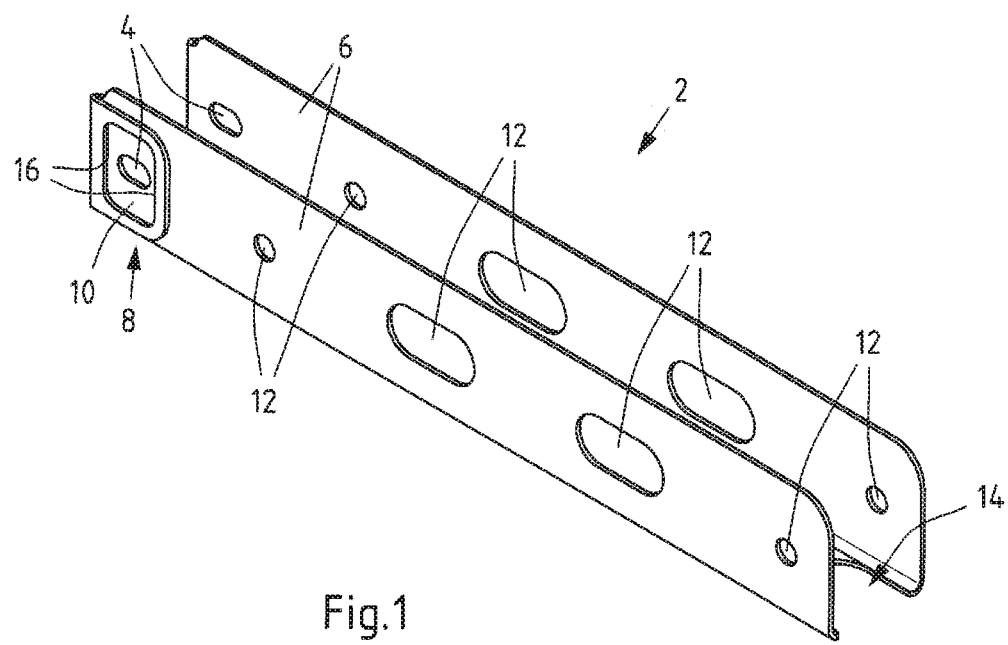
FIG. 1 a perspective view of a channel-shaped chassis suspension component.

FIG. 1 shows diagrammatically a chassis suspension component 2 for a motor vehicle. The chassis suspension component 2 shown symbolically is a control arm. The chassis suspension component 2 has an eccentric stop which allows the tracking and/or camber of the chassis suspension to be adjusted.

The chassis suspension component 2 is made from sheet metal, preferably sheet steel, which is shaped after being cut from a blank. The chassis suspension component is preferably made of high strength steel, in particular from multi-phase or complex phase steel which for example has a tensile strength of at least 800 MPa and a yield strength of at least 680 MPa. The metal thickness of the chassis suspension component 2 lies for example in the range from 1 to 4 mm, preferably in the range from 1.5 to 3 mm.

The chassis suspension component 2 has a substantially U-shaped or channel-like cross-sectional profile. Two mutually aligned passage holes 4 in the form of slots 4 are made in the legs 6 of the channel-like chassis suspension component 2. A connecting bolt 20 is pushed through the slots 4 of the channel-like chassis suspension component 2 and through a bearing bush (not shown) or similar arranged between the legs 6 (see FIG. 2). By sliding the connecting bolt 20 along the longitudinal axis of the slots 4, the camber of the assigned vehicle wheel, i.e. the angle of the wheel plane to the vertical, and the tracking of the vehicle wheels, can be set via the chassis suspension component 2 or the control arm.

A folded tab 8 is formed on at least one of the legs 6, preferably on both legs 6 of the chassis suspension component 2, wherein the tab 8 has a recess 10 surrounding the slot 4 of the leg 6 including the tab 8. The recess 10 of the tab here defines two elongate stop faces 16 running parallel to each other, which serve as a stop for an eccentric disc 18. The eccentric disc 18 is inserted in the recess 10 and is or can be connected rotationally fixedly to the connecting bolt 20.

Further recesses 12 are made in the legs 6 of the chassis suspension component 2, and are formed for example so as to be circular, oval or also in the form of a slot. These additional recesses 12 have various functions. At least two of the mutually aligned circular recesses (passage holes) 12 may also serve as connecting points for a bearing bush of a pivot bearing. The relatively large elongate recesses (slots) 12 reduce the weight of the chassis suspension component 2. Also, recesses 14 are formed in the base surface of the chassis suspension component 2 connecting the legs 6. The recesses 14 are open towards the end faces of the suspension component 2 and delimited by a U-shaped cut edge.

Figure 2:
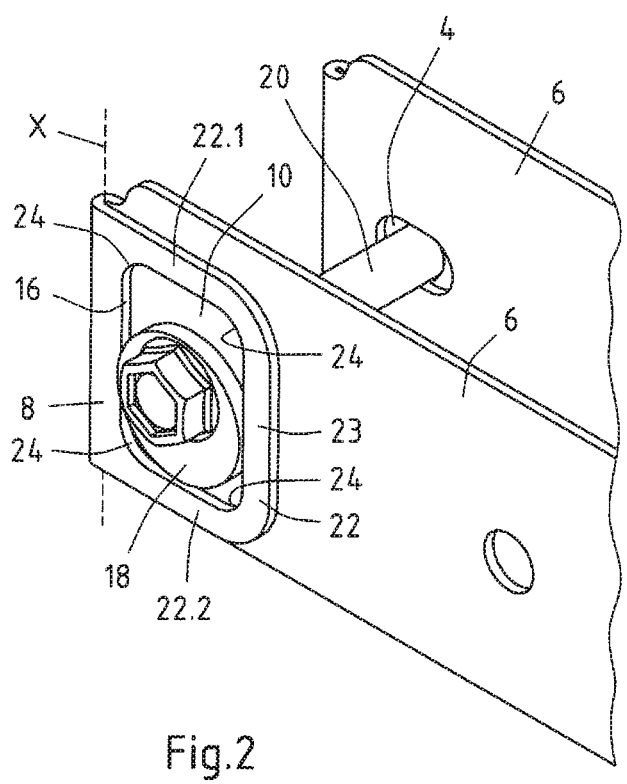
FIG. 2 in a perspective view, a portion of the chassis suspension component from FIG. 1 with a connecting bolt provided with an eccentric disc.

FIG. 2 shows a portion of the end of the chassis suspension component 2 including the folded tabs, wherein the connecting bolt 20 provided with eccentric discs 18 is received in the mutually aligned slots 4 of the legs 6. The eccentric discs 18 received in the recesses 10 of the folded tabs 8 are connected rotationally fixedly to the connecting bolt 20. For example, for this the connecting bolt 20 has an axial groove (not shown) in which the annular eccentric disc 18 engages by form fit with a protrusion protruding radially inwardly at its passage opening.

The recess 10 of the tab 8 defines a yoke-like web 22. The mutually parallel stop faces 16 are connected together by mutually parallel portions 22.1, 22.2 of the yoke-like web 22. The corners 24 of the recess 10 are configured so as to be round or rounded. Accordingly, the transitions between the two portions 22.1, 22.2 running parallel to each other and a middle part 23 of the yoke-like web 22 are preferably formed as arcuate web portions. The width B of the web 22 preferably amounts to around 3 to 4 times the metal sheet thickness D of the tab 8. It is furthermore evident that the fold line X of the tab 8 runs substantially orthogonally to the longitudinal axis of the slot 4 surrounded by the recess of the tab 8.

Figure 3A:
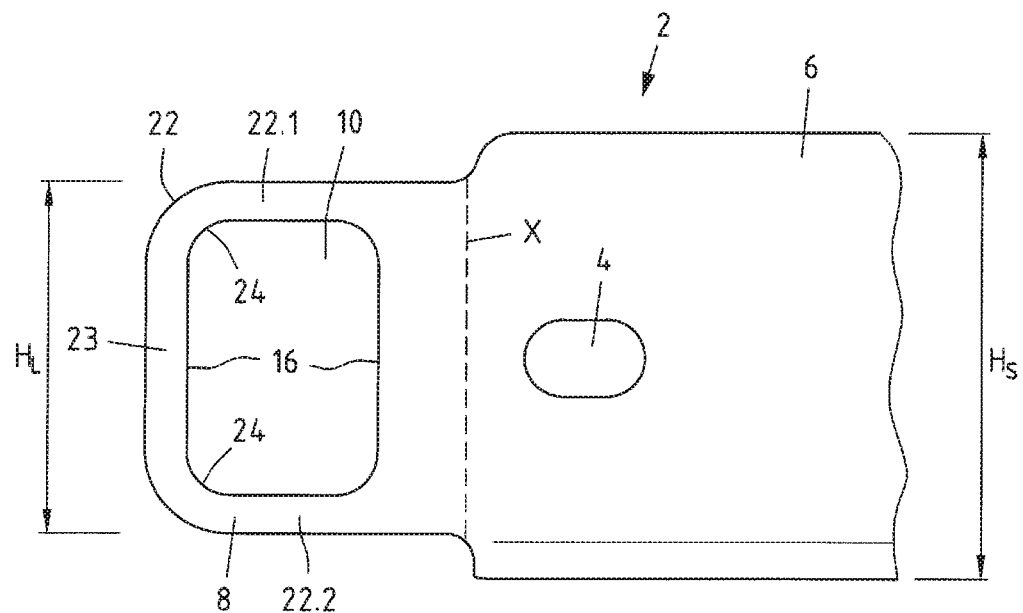
FIG. 3a in a side view, a portion of the chassis suspension component according to FIG. 1 but in a state in which the tab of the chassis suspension component according to the invention has not been folded.
Figure 3B:
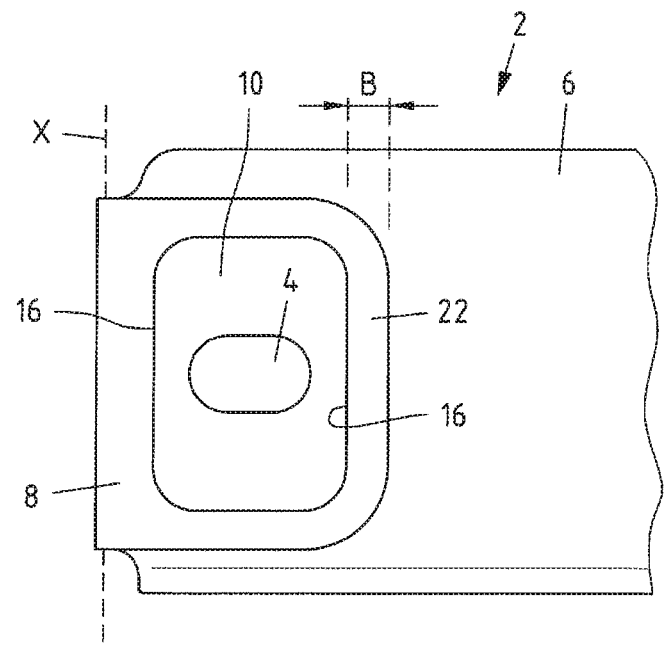
FIG. 3b in a side view, the portion of the chassis suspension component shown in FIG. 3a with folded tab.

FIG. 3a shows a portion of the chassis suspension component 2 with the tab 8 including the recess 10 in a state in which the tab 8 has not yet been folded. It is evident that the height $H_L$ of the tab 8 is significantly smaller than the height $H_S$ of the leg 6 including the tab 8. The height $H_L$ of the tab 8 amounts for example to around 0.8 times the height $H_S$ of the leg 6 including the tab 8. FIG. 3b shows the portion of the chassis suspension component 2 shown in FIG. 3a in the same view with folded tab 8.

Figure 4:
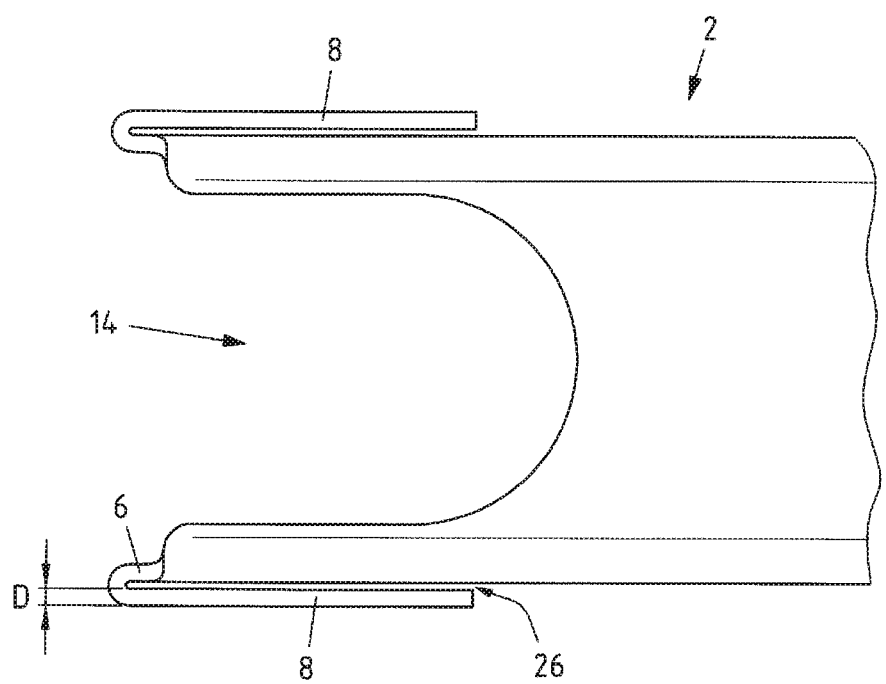
FIG. 4 in a top view, a portion of the chassis suspension component with folded tab according to FIG. 1.

FIG. 4 shows in a top view the portion of the control arm 2 shown in FIG. 3b. The leg 6 and the tab 8 running parallel thereto delimit a gap 26. The gap 26 has a gap width which lies for example in the range from 0.5 to 1 mm. The fold angle of the tab 8 is preferably substantially 180°.

Figure 5:
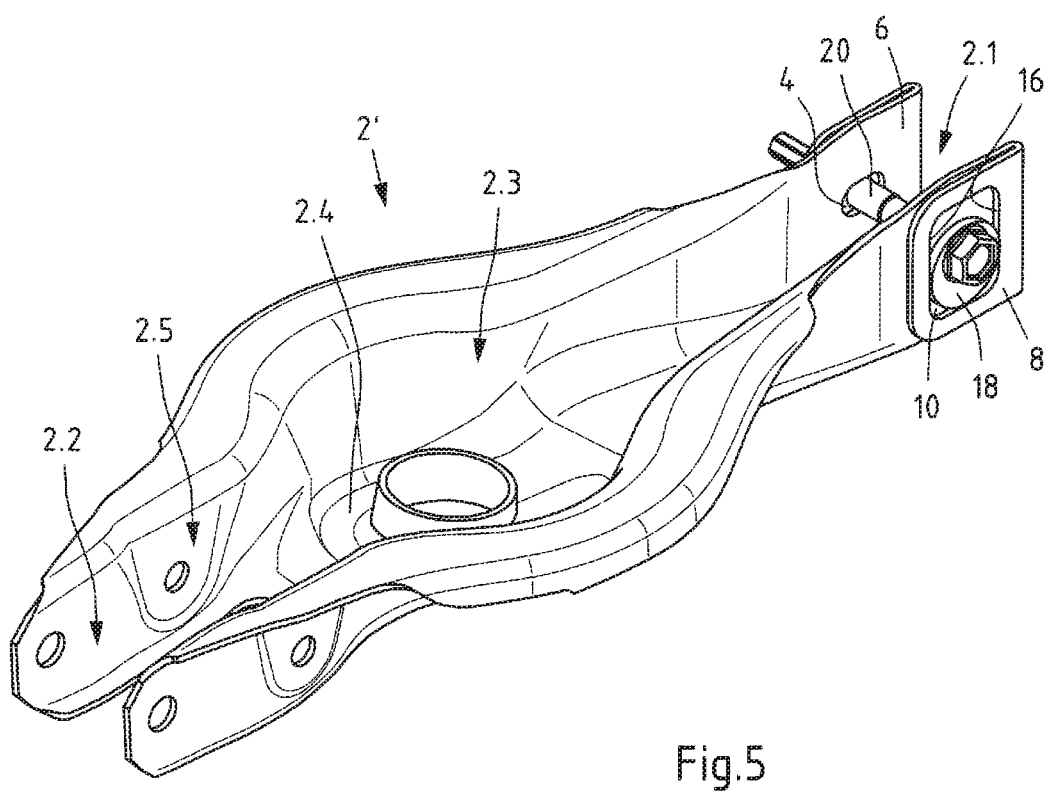
FIG. 5 a perspective view of a further exemplary embodiment of a channel-like chassis suspension component with folded tab as an eccentric stop.
Figure 6:
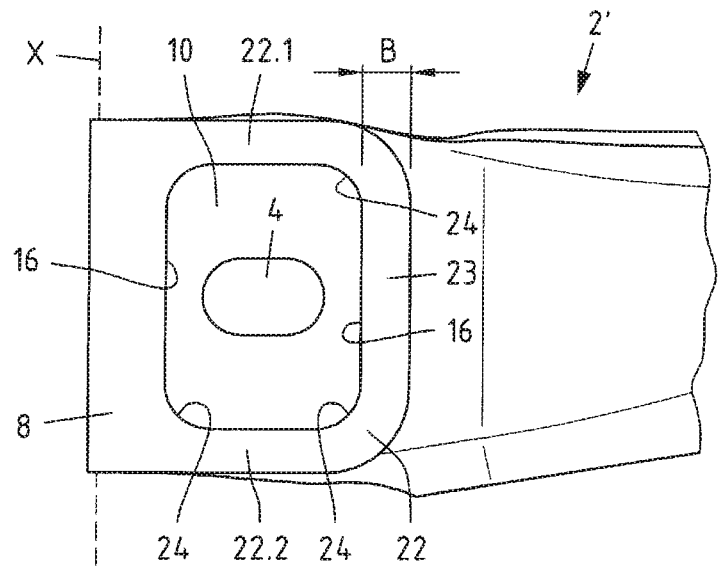
FIG. 6 in a side view, a portion of the chassis suspension component from FIG. 5 but without the connecting bolt and without the eccentric disc.
Figure 7:
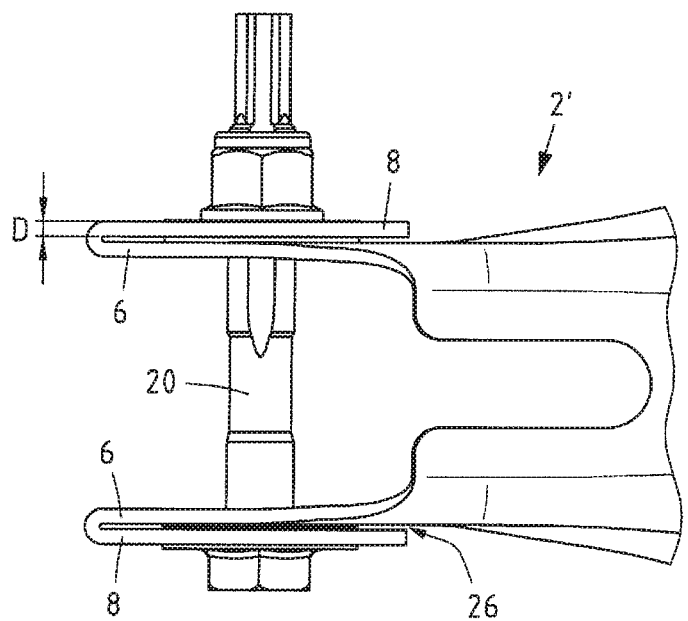
FIG. 7 in a top view, a portion of the chassis suspension component from FIG. 5.

FIGS. 5 to 7 show a further exemplary embodiment of a chassis suspension component 2' which has folded metal tabs 8 as an eccentric stop. The chassis suspension component 2' shown is a single-shell, channel-like control arm (spring control arm). The control arm 2' is made from sheet steel and has a first end portion 2.1 which is configured for connection to a chassis suspension carrier, for example a rear axle carrier, a second end portion 2.1 which is configured for connection on the wheel side, a portion 2.3 of greater width formed between the two end portions 2.1, 2.2 and defining a spring seat 2.4 for supporting a coil spring (not shown), and a connecting portion 2.5 formed between the spring seat 2.4 and the second end portion 2.2 for connection of a damper (not shown).

The end portion 2.1 of the control arm 2' has for its connection two mutually aligned slots 4 formed in the legs 6 of the channel-like control arm body. The longitudinal axes of the slots 4 run substantially parallel to each other and in the direction of the longitudinal extension of the control arm 2'.

A connecting bolt 20 is inserted in the slots 4 and connected rotationally fixedly to two eccentric discs 18. The tabs 8 serving as eccentric stops are formed integrally on the single-shell control arm 2'. They are formed on the end face of both legs 6 and folded by around 180° so that they run parallel to the outside of the legs 6. The tabs 8 have recesses 10 in which the eccentric discs 18 are received. The respective recess 10 defines two elongate stop faces 16 running parallel to each other as stops for the eccentric disc 18.

The recess 10 surrounding the slot 4 in the respective tab 8 here defines a yoke-like web 22, wherein the two stop faces 16 are connected together by web portions 22.1, 22.2 running parallel to each other. The corners 24 of the recess 10 are rounded. Accordingly, the transitions between the recesses 22.1, 22.2 and the middle part 23 of the yoke-like web 22 are configured so as to be arcuate. The width B of the web 22 amounts for example to around 3 to 4 times the metal sheet thickness D of the tab 8. The fold line X of the tab 8 runs substantially orthogonally to the longitudinal axis of the slot 4. The leg 6 and the tab 8 running parallel thereto delimit a gap 26 with a gap width for example in the range from 0.5 to 3 mm.

The execution of the invention is not restricted to the exemplary embodiments depicted in the drawing. Rather numerous variants are conceivable which also make use of embodiments of the invention disclosed in the attached claims and deviating from the examples shown.

While several examples of the invention are shown in the accompanying figures and described in detail hereinabove, other aspects will be apparent to, and readily made by, those skilled in the art without departing from the scope and spirit of the disclosure. Accordingly, the foregoing description is intended to be illustrative rather than restrictive. The invention described hereinabove is defined by the appended claims and all changes to the invention that fall within the meaning and range of equivalency of the claims are to be embraced within their scope.

The invention claimed is:

1. A chassis suspension component with a bracket made from a formable base material, the chassis suspension component comprising:
   at least one slot configured for receiving a connecting bolt; and
   at least one stop for an eccentric disc configured to be connected rotationally fixedly to the connecting bolt,
   wherein a tab formed from the base material and folded relative to a body portion of the chassis suspension component comprises a recess surrounding the slot,
   wherein the recess defines two elongate stop faces running parallel to each other, and
   wherein the stop faces serve as a stop for the eccentric disc.

2. The chassis suspension component according to claim 1, wherein the recess is configured so as to be elongate.

3. The chassis suspension component according to claim 1, wherein the recess has round or rounded corners.

4. The chassis suspension component according to any of claim 1, wherein the tab is folded such that a fold line runs transversely to the longitudinal axis of the at least one slot.

5. The chassis suspension component according to claim 1, wherein the base material, with the exception of the folded tab, is formed as a substantially channel-like body with two legs, wherein at least one of the legs comprises the at least one slot.

6. The chassis suspension component according to claim 5, wherein the tab is folded at an end face of the leg comprising the at least one slot.

7. The chassis suspension component according to claim 5, wherein the folded tab and the leg comprising the tab delimit a gap, wherein the width of the gap lies in the range from 0.1 to 10 mm.

8. The chassis suspension component according to claim 5, wherein the height of the tab is smaller than the height of the leg comprising the tab.

9. The chassis suspension component according to claim 1, wherein the recess in the tab delimits a yoke-shaped web of the tab, wherein the web has a width which amounts to at least twice the thickness of the tab.

10. The chassis suspension component according to claim 9, wherein a minimal width of the web amounts to less than 15 times, the thickness of the tab.

* * * * *

UNITED STATES PATENT AND TRADEMARK OFFICE
CERTIFICATE OF CORRECTION

PATENT NO. : 11,285,769 B2
APPLICATION NO. : 16/284209
DATED : March 29, 2022
INVENTOR(S) : Mario Krolo It is certified that error appears in the above-identified patent and that said Letters Patent is hereby corrected as shown below:

In the Claims

Column 8, Line 15, Claim 4, delete "to any of" and insert -- to --

Signed and Sealed this
Seventh Day of June, 2022

Katherine Kelly Vidal
*Director of the United States Patent and Trademark Office*